(12) United States Patent
Ferrara

(10) Patent No.: US 7,976,099 B2
(45) Date of Patent: Jul. 12, 2011

(54) TRAVEL TRAY LINER

(76) Inventor: Michael Ferrara, Sayville, NY (US)

( * ) Notice: Subject to any disclaimer, the term of this patent is extended or adjusted under 35 U.S.C. 154(b) by 106 days.

(21) Appl. No.: 12/380,159

(22) Filed: Feb. 24, 2009

(65) Prior Publication Data
US 2009/0223418 A1   Sep. 10, 2009

Related U.S. Application Data

(60) Provisional application No. 61/066,949, filed on Feb. 25, 2008.

(51) Int. Cl.
*A47B 83/02* (2006.01)
*A47C 7/62* (2006.01)
(52) U.S. Cl. ............ 297/163; 297/135; 297/188.06
(58) Field of Classification Search ............ 297/188.2, 297/188.06, 188.07, 135, 163
See application file for complete search history.

(56) References Cited

U.S. PATENT DOCUMENTS

| | | | |
|---|---|---|---|
| 3,541,730 A | | 11/1970 | Ballantyne |
| 3,552,595 A | | 1/1971 | Gerner |
| 3,729,037 A | * | 4/1973 | Dare et al. ............ 150/158 |
| 3,733,620 A | * | 5/1973 | Glintz ............ 4/515 |
| 4,606,461 A | | 8/1986 | Bolton |
| 4,678,095 A | | 7/1987 | Barnett |
| 5,053,262 A | * | 10/1991 | Kerr ............ 428/81 |
| 5,247,713 A | | 9/1993 | Larson |
| 5,256,457 A | * | 10/1993 | Pantaleo et al. ............ 428/13 |
| 5,316,386 A | * | 5/1994 | Moore ............ 383/10 |
| D358,024 S | * | 5/1995 | Wilson ............ D3/233 |
| D376,689 S | * | 12/1996 | Doppelt ............ D3/274 |
| 5,658,620 A | * | 8/1997 | Ross ............ 428/9 |
| 5,823,615 A | | 10/1998 | Haut |
| 5,875,894 A | * | 3/1999 | Stromme ............ 206/541 |
| 6,003,708 A | | 12/1999 | Meyering |
| 6,070,729 A | * | 6/2000 | Barnes ............ 206/581 |
| 6,116,167 A | * | 9/2000 | Rabe ............ 108/90 |
| 6,454,349 B1 | | 9/2002 | Konya |
| 6,591,763 B2 | | 7/2003 | Getfield |
| 6,746,735 B2 | * | 6/2004 | Snedeker ............ 428/34.1 |
| 7,267,400 B2 | | 9/2007 | Cutshall |
| 2002/0060480 A1 | | 5/2002 | Catelli |
| 2006/0049193 A1 | | 3/2006 | D'Olimpio |
| 2007/0029848 A1 | | 2/2007 | Probst |
| 2007/0205640 A1 | | 9/2007 | Pecorino |

* cited by examiner

*Primary Examiner* — Sarah B McPartlin
(74) *Attorney, Agent, or Firm* — Alfred M. Walker

(57) ABSTRACT

A tray liner of flexible construction relies on the rigid airline or railroad car seat tray underneath it to create a horizontal clean and sanitary surface useful for supporting food and drink utensils. While it is especially useful for handling food items for toddlers or small children during travel, the tray liner may also be used on a high chair in a restaurant. It may also be used by older children to provide a play area for toys with multiple parts that may easily fall off a tray. Adult use by the general public or by handicapped people also offers a more secure dining platform with spill protection during travel. It has soft semi-rigid edges which function to keep objects or fluids from falling off the supporting tray. It has a sturdy outer covering with an impervious interior surface which is impermeable to liquids and waterproof.

16 Claims, 7 Drawing Sheets

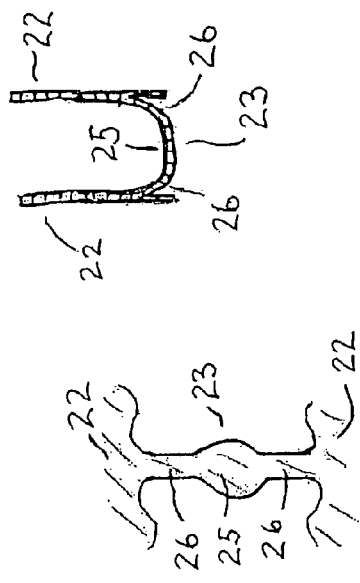
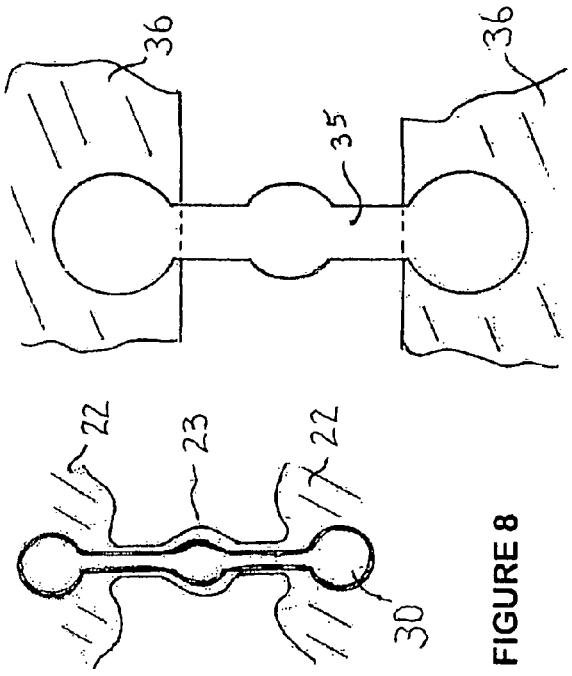
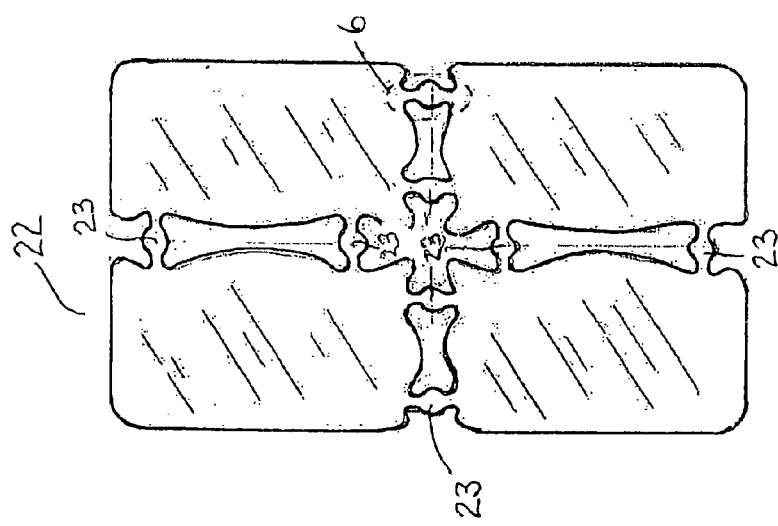

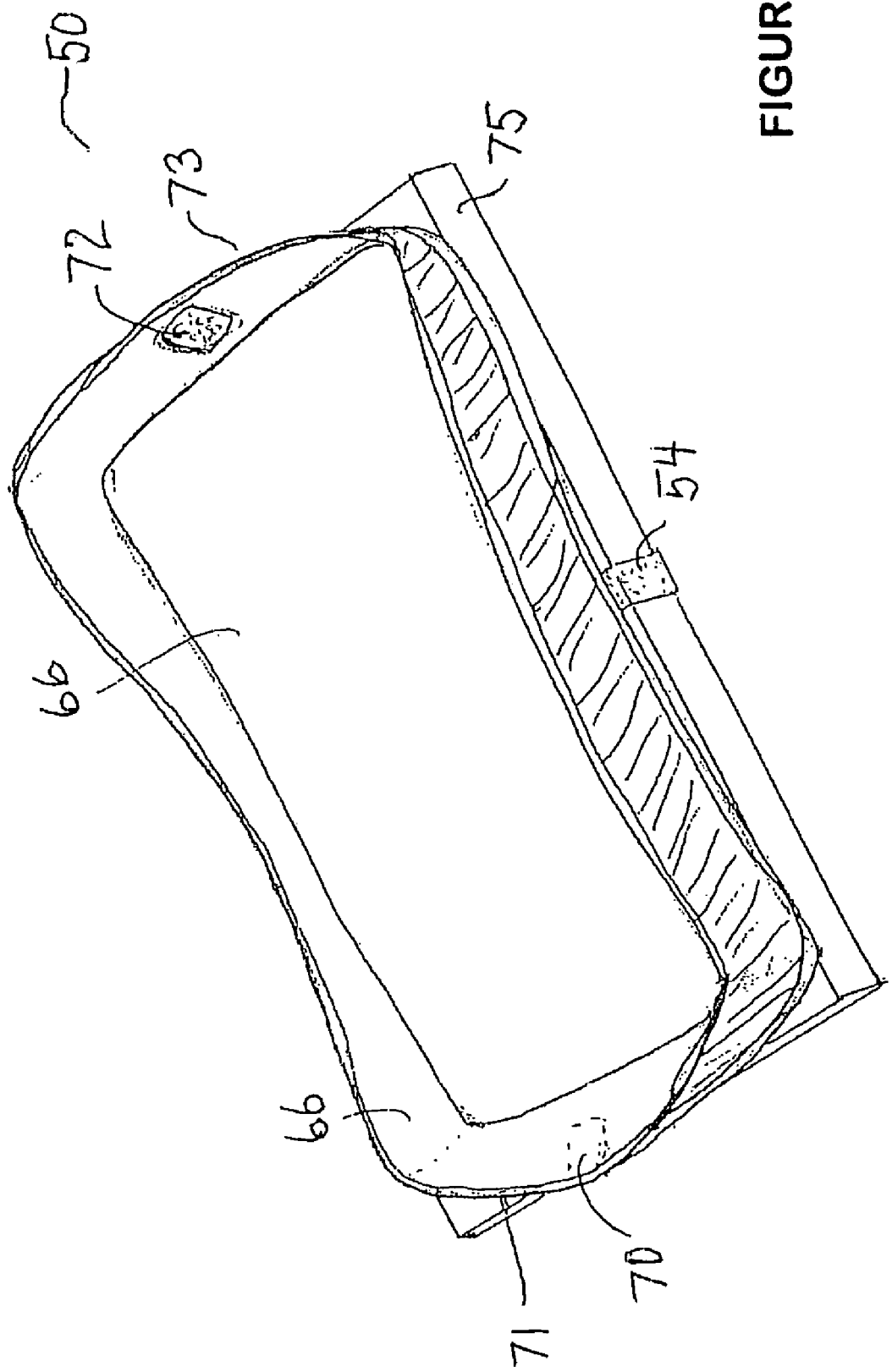

TRAVEL TRAY LINER

RELATED APPLICATIONS

This application is based in part upon provisional application Ser. No. 61/066,949 filed Feb. 25, 2008, which application is incorporated by reference herein. Applicant claims priority under 35 U.S.C. § 119(e) therefrom.

FIELD OF THE INVENTION

The present invention relates to a foldable, sanitary travel tray liner with upright walls for children and other travelers.

BACKGROUND OF THE INVENTION

When traveling with an infant or toddler, the use of a typical airline or railroad pull-down tray is greatly compromised. One problem is simply the injury aspect of the hard sharp edges of such trays. Another exposure is spillage of liquids which will run off the flat surface quickly before any wiping can be attempted. Any public conveyance also presents exposure to unsanitary surfaces which are more difficult for infants and toddlers to ward off.

The prior art reveals several related patents and/or patent applications. U.S. Pat. No. 4,606,461 of Bolton and US patent application 2007/0205640 of Pecorino relate to portable food containers. Other US patents/applications disclose rigid plastic trays such as 2002/0060480 of Catelli, and 5,823,615 of Haut for high chairs. U.S. Pat. No. 6,591,763 of Getfield describes an over-the-seat travel tray with upright walls; U.S. Pat. No. 7,276,400 of Cutshall is for a lockable folding tray. U.S. Pat. No. 5,247,713 of Larson describes a waterbed mattress tray, while U.S. Pat. No. 6,454,349 of Koyna is for a travel tray for a seat. US patent application 2006/0049193 of D'Olimpio et al discloses a collapsible serving tray which is spring loaded. It is a rigid serving tray when its four hinged segments are in the open position.

The prior art does not disclose a portable travel tray liner that securely attaches to a travel tray to create a more compatible tray surface for infants and toddlers.

OBJECTS OF THE INVENTION

It is an object of the invention to provide a convenient light-weight travel tray liner with soft upright edge, impermeable surface outer covering of the inside and outside of the tray liner, and attachment strap for coupling/securing to an airline or railroad travel tray.

It is another object of this invention to provide a travel tray liner with a sanitary washable covering.

It is an yet another object of this invention to provide an inexpensive travel tray liner which folds twice into a small package when not in use and opens after a strap is unfastened.

It is also an object of this invention to provide a travel tray liner which, when folded, is in the shape of a purse with a carry strap.

SUMMARY OF THE INVENTION

In keeping with the aforementioned objects and others which may become apparent, this invention consists of a tray liner of flexible construction which relies on the rigid tray underneath it to create a horizontal surface useful for supporting food and drink utensils. While it is especially useful for handling food items for toddlers or small children during travel, the tray liner of this invention may also be used on a high chair in a restaurant. It may also be used by older children to provide a play area for toys with multiple parts that may easily fall off a tray. Adult use by the general public or by handicapped people also offers a more secure dining platform with spill protection during travel.

In one embodiment, in its folded travel configuration it is a soft item with an end dimension one-quarter of the open area of the liner. A strap using a snap or hook and loop fastener or other type of closure keeps it folded. When the fastener is opened, the tray liner automatically unfolds into a flat configuration with a soft raised edge including a water impermeable covering (which also covers all other outer surfaces) filled with soft foam or fiber-fill. A strap attached to the center of the proximal edge mates with a similar strap at the center of the distal edge with a spring buckle underneath the travel tray thereby sturdily attaching the tray liner to the travel tray. This now forms a sanitary tray top with a soft raised edge. The outer covering may also be impregnated with an antimicrobial agent such as Microban™ from Microban Intl. Ltd. of Huntersville, N.C. The raised edge will catch any spill providing adequate time for wiping; the surface can be easily washed as well.

The automatic opening action is powered by a flexible layer imbedded between two outer layers of soft vinyl type material. This flexible layer includes two or more, preferably, four generally rectangular sections attached to each other by a plurality of strategically placed leaf springs, such as eight leaf springs or other fasteners. The leaf springs may be integrally cut out of the same flexible layer in a single die cutting step of manufacture. Alternatively, auxiliary leaf springs may be attached on top of the integral leaf springs or attached to four separate rectangular sections. In the preferred embodiment, two other embedded thin layers of soft foldable sheet material are used. They would be placed on either side of the flexible leaf spring layer to protect the outer cover from possible sharp edges of the flexible layer and to provide a smoother inner substrate for the bottom of the tray liner.

An alternate preferred embodiment of this travel tray liner has only one fold and assumes the configuration of a purse shape with a carry strap when folded. It has soft semi-rigid edges which function to keep objects or fluids from falling off the supporting tray as in the previous embodiment. It has a sturdy outer covering with an impervious interior surface which is impermeable to liquids. An optional pocket formed by a mesh fabric layer on one outer surface provides a convenient storage compartment for flat objects such as a small book or a snack pouch. Since the folded configuration of this preferred embodiment encloses an interior space, small toys such as a bag of LEGO™ blocks, puzzle pieces, or a Barbie Doll™ can be carried within. Such toys with multiple pieces can be used more easily on a travel tray with the tray liner without fear of losing parts. The carry strap has an adjustable quick-disconnect buckle which facilitates its use to attach the travel tray liner to the travel tray when in use. The outer covering of the preferred embodiment may also be impregnated with an antimicrobial agent such as Microban™ from Microban Intl. Ltd. of Huntersville, N.C.

Preferably the outer material of the tray liner is 100% polyester to meet EN71 safety standards and CA flammability standards. The mesh is also 100% polyester. The inside liquid impermeable liner is preferably 100% EVA (ethylene vinyl acetate) polymer of about 2 mm in thickness. The inner backing is 100% polyvinyl chloride (PVC) of 0.7 mm thickness. While the size may vary, in order to fit the typical airline or railroad fold-down travel tray, the dimensions in the unfolded position of the travel tray liner is preferably 41 cm long by 26.6 cm in width, with a height of about 6 cm. The carry strap is preferably polypropylene.

BRIEF DESCRIPTION OF THE DRAWINGS

The present invention can best be understood in connection with the accompanying drawings. It is noted that the invention is not limited to the precise embodiments shown in drawings, in which:

FIG. 5 is a top plan view of a flexible embedded layer with integral leaf springs for easy folding and automatic unfolding.

FIG. 6 is a top detail view of an integral leaf spring cut out of the flexible layer material, as viewed in dashed oval line "6" of FIG. 5.

FIG. 7 is a side cross-section of an integral leaf spring showing the bending configuration of the wider central section as well as the narrower side sections.

FIG. 8 is a top detail of an integral leaf spring overlaid with a separate leaf spring.

FIG. 9 is a top detail of a flexible layer consisting of four separate panels attached by separate leaf springs.

FIG. 12 is a perspective view of the preferred embodiment travel tray liner attached to a travel tray.

DETAILED DESCRIPTION OF THE INVENTION

Figure 1:
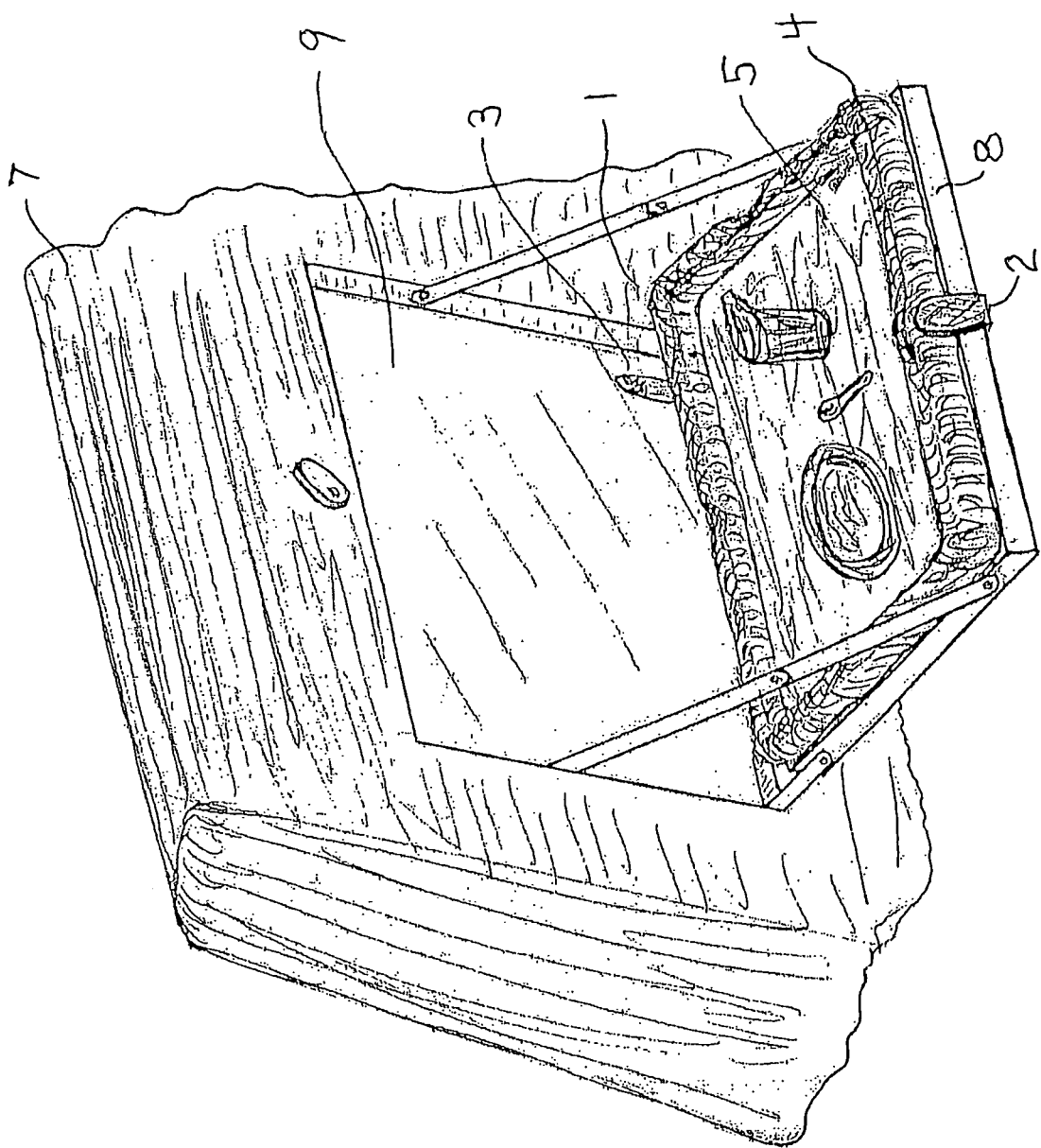
FIG. 1 is a perspective view of a typical travel tray attached to an airline or railroad seat in the open position with a travel tray liner of the present invention strapped to it.

FIG. 1 shows an airline or railroad seat back 7 with pull-down tray 8 and seat back tray recess 9. Other designs of travel trays may differ from this, but they typically have access to both the front edge and back edge of tray top. The travel tray liner 1 of this invention is strapped to tray 8 using one or more front straps 2, each strap being snap buckled or otherwise connected under tray 8 to a respective rear strap (not visible in this view). Tray liner 1 has a soft raised, upwardly extending foam or fiber filled edge 4 and a flat bottom surface 5. Strap 3 or other closure fastener is for keeping the travel tray liner folded when not in use.

Figure 2:
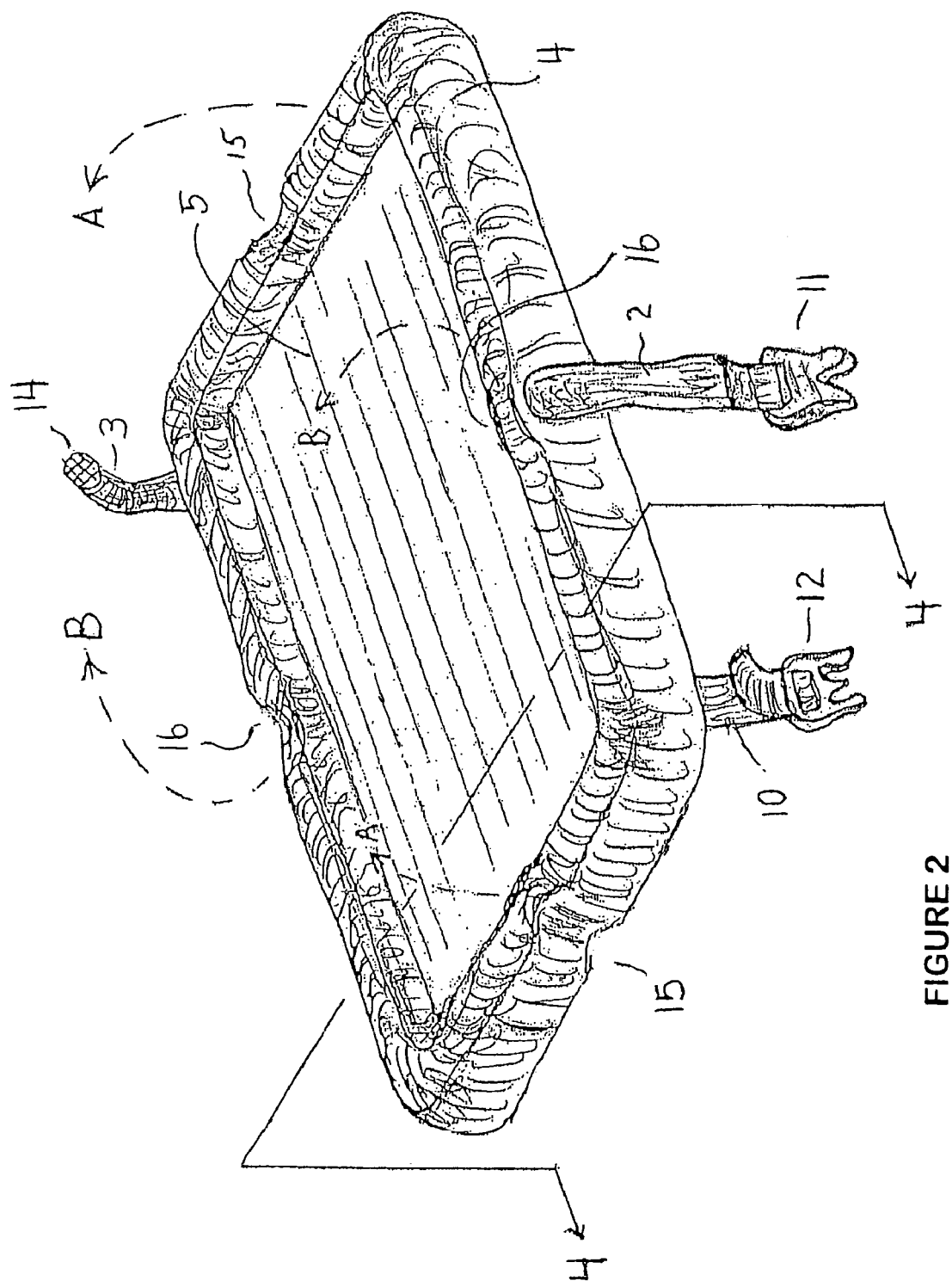
FIG. 2 is a perspective view of a travel tray liner of this invention in the open configuration showing the various external parts.

FIG. 2 shows travel tray liner 1 in the open position; it is only semi-rigid and depends on the tray to which it would be strapped (via fasteners such as straps 2 and 10) to offer rigidity to support objects on its flat surface 5. Buckle 11 mates with buckle 12. Other conventional connection means may be provided to attach straps 2 and 10 together. Note that raised edge 4 has two fold regions, 15, 15 at the center of the distal ends and 16, 16 at the centers of the front and back, which are not filled for ease of folding. Fold strap 3 preferably has a patch of hook material 14 which mates with loop material on the bottom, although other mating connections such as snaps or otherwise can be used. Note the folding sequence "A", indicated by dashed directional arrows "A-A", then folding sequence "B", indicated by dashed directional arrows "B-B", for folding the travel tray liner 1.

Travel trays in airline cabins are typically 17.5 inches by 10.5 inches. While other dimensions may be utilized, depending upon the size of the travel tray upon which the liner is to be placed, in a typical embodiment travel tray 1 is 17 inches in length across the front and 10 inches in width extending front to back. Edge walls 4 are preferably one inch thick and 1 ½ inches in height.

Figure 3:
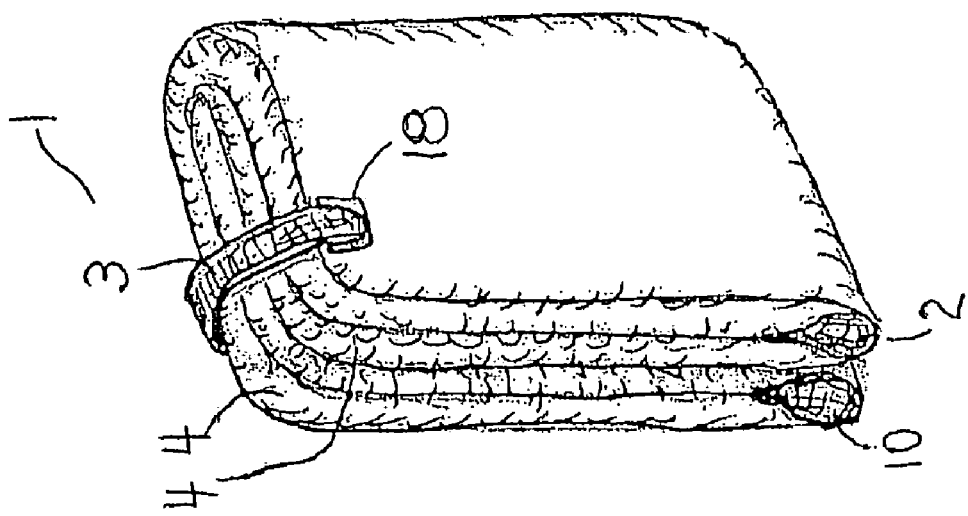
FIG. 3 is a perspective view of the travel tray liner of FIG. 2 in its folded configuration.

FIG. 3 shows the folded configuration with strap 3 secured with loop patch 18. Note that straps 10 and 2 are tucked inside tray 1 before folding.

Figure 4:
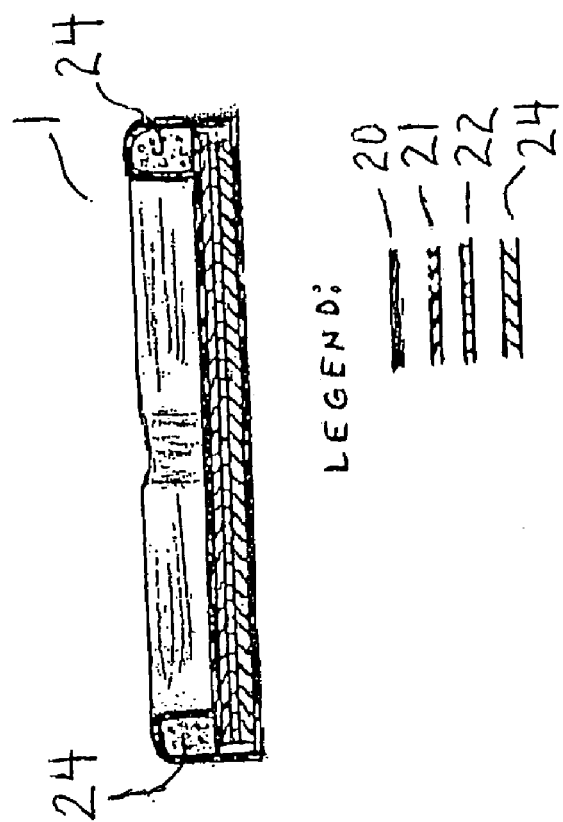
FIG. 4 is an end view cross-section showing the various embedded layers, as viewed along cross-sectional line "4-4" of FIG. 2, wherein the reference numeral figure legend indicates the types of material in the various layers depicted.

FIG. 4 is a cross-section view of the end as located on FIG. 2 showing outer covering 20, soft layer 21, flexible (springy) layer 22, bottom soft layer 23, and foam or fiber fill 24. Soft layers 21 and 23 are rectangular and are the full size of the bottom surface 5; they may be a number of easily foldable materials such as expanded paper or preferably ethylene vinyl acetate (EVA) copolymer foam. Flexible springy layer 22 may be a sheet of polyvinyl chloride (PVC) material preferably of between about 0.015"-0.025" thickness. Other materials such as styrene, polypropylene or polycarbonate may be substituted. A superior material for this layer is an acetal copolymer sheet. While other dimensions may vary depending upon the size of the travel tray, the inner flexible base layer 22 is typically 16.75 inches by 9.75 inches.

FIG. 5 shows layer 22 of outside dimensions slightly less than bottom surface 5 with several shaped cutouts to form integral leaf springs 23. This can be die cut in a single operation using an inexpensive steel rule die.

Although other spring connectors may be used connecting regions of foldable bottom surface 5, FIG. 6 is an enlarged view of a preferable single leaf spring 23 with preferably wide center section 25 and narrower side sections 26, as shown in the dashed detail oval "6" of FIG. 5. Leaf spring 23 is preferably about 0.6 inches in length between adjacent panels of springy layer 22.

This shape will fold as shown in FIG. 7 providing a somewhat flat apex section 25 and side sections 26 which fold less than 90 degrees. The wide section 25 better resists being crushed into a sharp bend than if the leaf spring 23 were of uniform width. The actual dimensions of leaf springs 23 depend on material, spring action desired, thickness of layer 22, and life expectancy (number of openings and closings). An excellent plastic spring material is an acetal copolymer CELCON™ from Ticona Engineering Polymers (shown in the ticona corn website).

This spring material can be bonded at the regions of integral leaf springs 23 as shown in FIG. 8 if cut into the configuration 30 for reinforcement. Metallic leaf springs of the same shape, such as stainless steel, can also be used. If layer 22 were configured of four rectangles 36, as shown in FIG. 9, they can be attached by eight leaf springs 35 bonded as shown.

While FIG. 2 shows a four fold folding sequence of layer 22 of travel tray liner 1 in a pair of axial directions designated by arrows "A-A" and "B-B", which are perpendicular to each other, in an alternate embodiment, travel tray liner 1 could be folded not in four quadrants as shown in FIGS. 2 and 5, but simply in half in two halves, along either folds "A-A" or "B-B" but not both.

Figure 10:
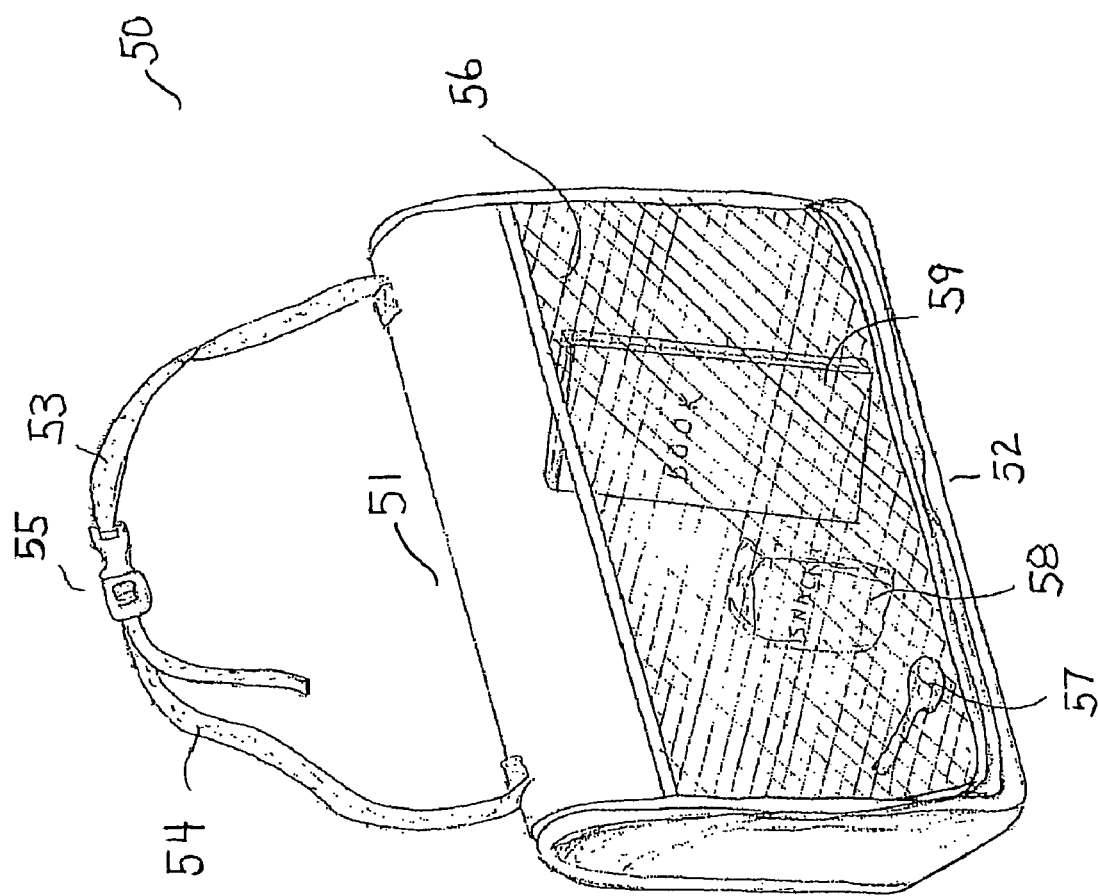
FIG. 10 is a perspective view of the preferred embodiment of travel tray liner in its folded configuration.
Figure 11:
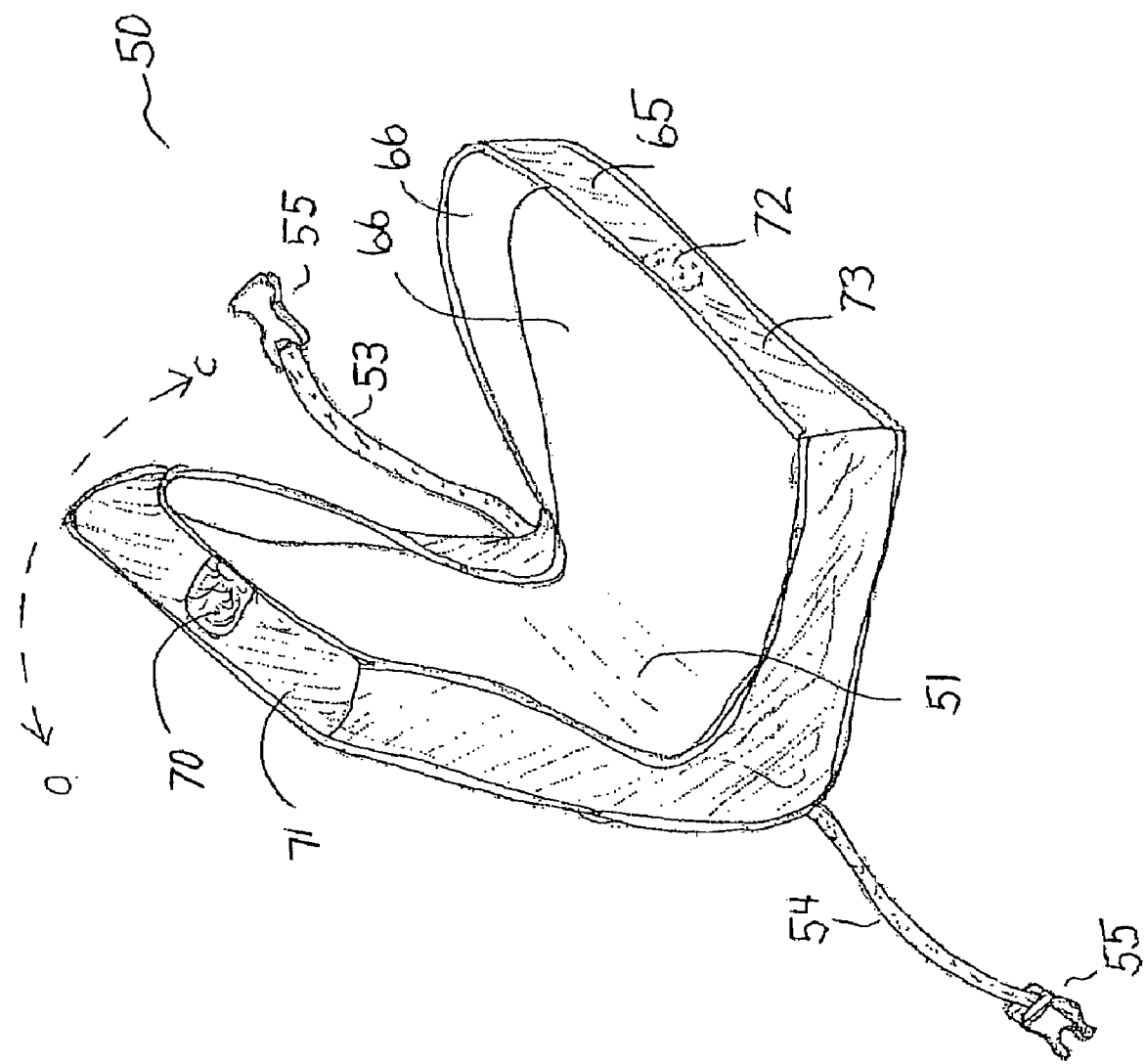
FIG. 11 is a perspective view of the preferred embodiment of FIG. 10 in a partially unfolded configuration.

FIGS. 10-12 illustrate the preferred embodiment 50 of travel tray liner of this invention. In FIG. 10 the top edge 51 corresponds with the fold axis. Fixed strap 53 and adjustable strap 54 are engaged by quick-disconnect buckle 55 forming a convenient carry strap. One of the distal ends of liner 50 nests into the other forming the bottom of the configuration shown in FIG. 10. VELCRO® hook and loop fastener patches at the center 52 keep liner 50 folded. Optional fabric panel 56 open at the top is preferably made of open mesh such as a lightweight sturdy nylon. Flat objects such as the illustrated spoon 57, snack 58, or book 59 can be conveniently carried in the pouch thus formed.

FIG. 11 shows tray liner 50 partially opened. Further opening in the "O" direction or folding in the "C" direction will either open or close liner 50. Distal ends 71 and 73, being of semi-rigid material will fold such that end 71 will nest within end 73, and VELCRO® hook and loop fastener patch 70 on the exterior will engage corresponding patch 72 on the interior surface to lock in the folded configuration. It is further noted that a zipper (not shown) may be used instead of VELCRO® hook and loop fastener patches 70 and 72 to lock tray liner 50 in the folded configuration. Tray liner 50 preferably includes an outer fabric covering 65 which is easy to clean and an interior liner 66 which is waterproof, such as latex, polyurethane, or vinyl material. Note that the edges fold in flat against the interior surface at fold region 51. Note that an enclosed space is formed when in the folded or closed position. FIG. 12 shows tray liner 50 attached to supporting tray 75.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

I claim:

1. A travel tray liner in combination with an open airline or railroad traveler's pull-down tray comprising:
    a traveler's fold down fray provided on the rear of a seat in front of the traveler;
    a panel of flexible material on a top surface of said traveler's fold down tray, said panel having an upper side and a bottom side;
    a fold line region in said panel located midway between, oppositely facing edges of said panel;
    a soft vertically extending rim along a whole periphery and on the upper side of said panel, said vertically extending rim for containing food and drink utensils on said upper side of said panel when said panel is deployed on said traveler's fold down tray;
    said vertically extending rim having opposite distal end walls;
    at least one fold line regions in oppositely facing portions of said rim to allow said liner to be folded when not in use;
    said panel being foldable along said fold line regions with said vertically extending rim folding inwardly;
    a portion of said rim at one oppositely facing edge of said panel nesting within a portion of said rim at the oppositely facing edge of said panel when folded, rendering said travel fray liner compact for travel and ready for use elsewhere and at another time;
    straps for removably securing said fray liner to said traveler's pull down tray, one of said straps adapted to retain said liner in a folded position;
    one first distal end wall of said pair of distal end walls of said liner nesting into an opposite second other distal end wall of said pair of distal end walls of said liner in a closed carry configuration, thereby forming a bottom of said travel tray liner in said folded configuration, forming an interior storage space therebetween;
    wherein an upper edge of said rim is filled with soft foam or fiber.

2. The travel tray liner of claim 1 in which the nested portions of said rim include means for releasably connecting said nested portions together.

3. The travel tray liner of claim 2 in which said connecting means comprises hook and loop fasteners.

4. The travel tray liner of claim 2 in which a quick connect and disconnect strap is attached adjacent to opposite edges of said panel along the fold line regions on the bottom side of said panel, whereby said strap secures said panel to the underlying traveler's fold down tray when deployed and to function as a shoulder strap to carry said travel tray liner when in a folded position.

5. The travel tray liner of claim 4 having a pocket mounted on a bottom surface of said panel between said fold line regions and a distal edge of said panel for storing small items of use.

6. The travel tray liner of claim 1 wherein said liner is liquid impermeable.

7. The travel tray liner as in claim 1 wherein in said folded position, said travel tray liner encloses said interior storage space, said interior storage space adapted to catty multiple toy pieces.

8. The travel tray liner as in claim 1 wherein said liner is coated with a pathogen resistant sanitary coating.

9. A method of using a travel tray liner on a traveler's fold-down airline or railroad tray comprising the steps of:
    placing a panel of flexible material on a top surface of said traveler's fold-down tray, said panel having an upper side and a bottom side, a soft vertically extending rim along a whole periphery and on the upper side of said panel, an upper edge of said rim filled with soft foam or fiber, said vertically extending rim for containing food and drink utensils on said upper side of said panel;
    using opposite ends of a strap attached adjacent to opposite edges of said panel on the bottom side of said panel to secure said liner to said traveler's fold down tray, said strap having a quick connect and disconnect buckle whereby said strap is wrapped around said tray when in use and adapted to be used as a shoulder strap when said travel tray liner is in a folded position; and
    folding said liner along a fold line region in said panel and said rim located midway between oppositely facing edges of said panel, said vertically extending rim folding inwardly, a portion of said rim at one oppositely facing edge of said panel nesting within a portion of said rim at the oppositely facing edge of said panel when folded, rendering said travel tray liner compact for travel and ready for use elsewhere and at another time.

10. The method of claim 9 wherein said travel tray liner is liquid impermeable.

11. The method as in claim 9 wherein said travel tray liner is coated with, a pathogen resistant sanitary coating.

12. A travel tray liner comprising:
    a panel of flexible material adapted for use on a top surface of a rigid tray, said panel having an upper side and a bottom side;
    at least one fold line region in said panel for allowing said panel to be folded into a small, compact package;
    a soft vertically extending rim along a whole periphery and on the upper side of said panel, said vertically extending rim for containing food and drink utensils on said upper side of said panel when said panel is in use on said rigid tray;

strap members with quick connect and disconnect buckles to allow said liner when deployed to secure said liner to said rigid tray;

said panel being foldable along said at least one fold line region with said vertically extending rim folding inwardly;

said panel being foldable again along another fold line region;

said strap members adapted also to secure said liner in a folded position; and said at least one fold line region has a cutout with an integral leaf spring.

13. The travel tray liner of claim 12 in which the leaf spring is plastic.

14. The travel tray liner of claim 12 in which the leaf spring is stainless steel.

15. The travel tray liner of claim 12 wherein said liner is liquid impermeable.

16. The travel tray liner as in claim 12 wherein said liner is coated will a pathogen resistant sanitary coating.

* * * * *